United States Patent [19]

Suzuki

[11] Patent Number: 4,472,043
[45] Date of Patent: Sep. 18, 1984

[54] CAMERA PROVIDED WITH A DEVICE FOR GENERATING A SIGNAL REPRESENTATIVE OF THE FINISHED STATE OF THE EXPOSURE

[75] Inventor: Ryoichi Suzuki, Kanagawa, Japan

[73] Assignee: Canon Kabushiki Kaisha, Tokyo, Japan

[21] Appl. No.: 403,334

[22] Filed: Jul. 30, 1982

[30] Foreign Application Priority Data

Aug. 8, 1981 [JP] Japan .............................. 56-124217

[51] Int. Cl.³ .......................................... G03B 7/099
[52] U.S. Cl. .................................. 354/435; 354/483
[58] Field of Search .................................. 354/26–30, 354/42, 49, 59, 50, 51, 432, 435–440, 459, 476, 481–483

[56] References Cited

U.S. PATENT DOCUMENTS 4,009,866  3/1977  Iwata et al. ........................ 354/29
4,258,990  3/1981  Arisaka et al. ..................... 354/29

Primary Examiner—William B. Perkey
Attorney, Agent, or Firm—Toren, McGeady and Stanger

[57] ABSTRACT

An electromagnetically driven diaphragm shutter having the shutter blade serving at the same time as the diaphragm, uses a quasi-TTL actual aperture light measuring system for measuring the incident light by providing the light measuring element at the auxiliary opening (auxiliary aperture) whose opening amount varies in proportion to that of the principal opening. The auxiliary opening is variable with the opening of the shutter blades. Structure is provided for generating and holding a signal representative of the finished state of an exposure, which is adapted to detect the output variation of the light measuring element at the auxiliary aperture when the shutter is closed and then to supply certainly the signal to enable subsequent action such as start of motorized film winding.

8 Claims, 5 Drawing Figures

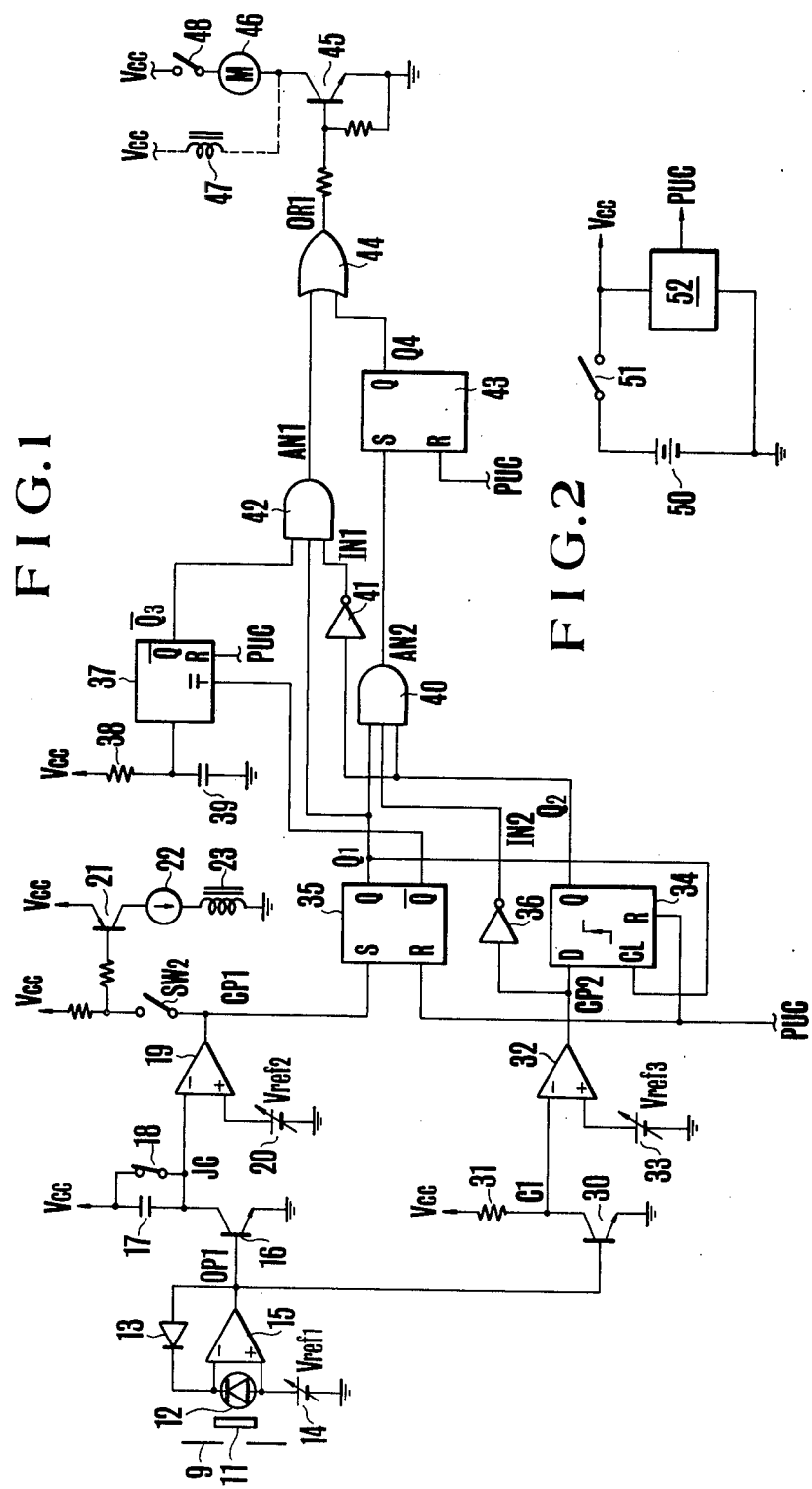

FIG.3
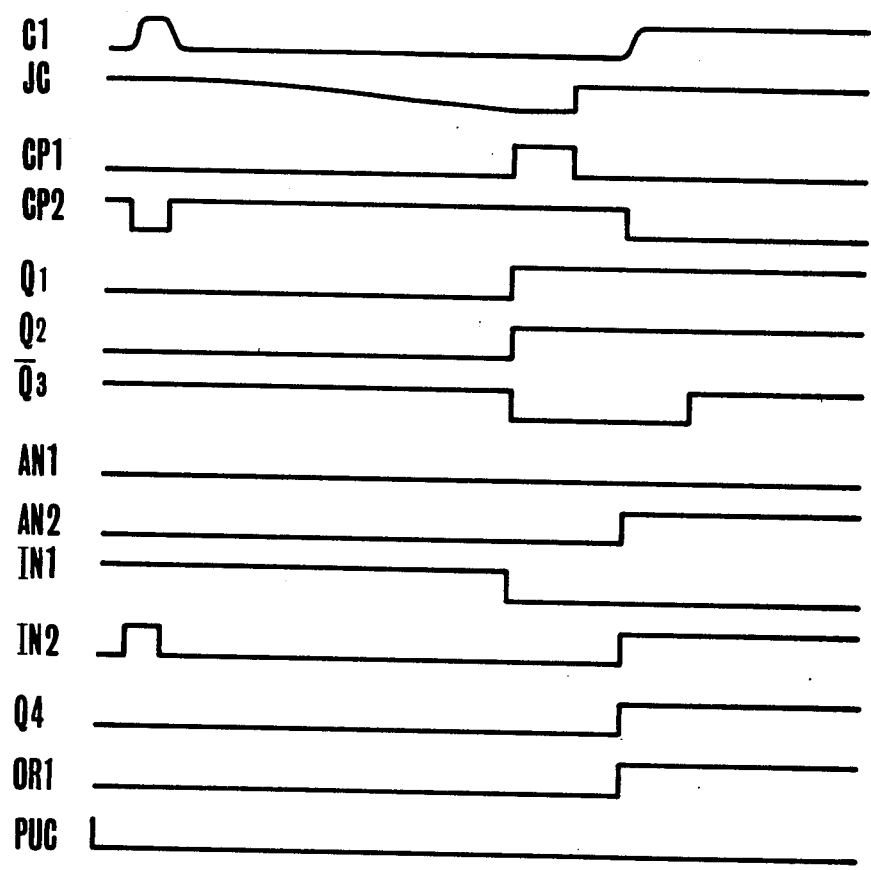
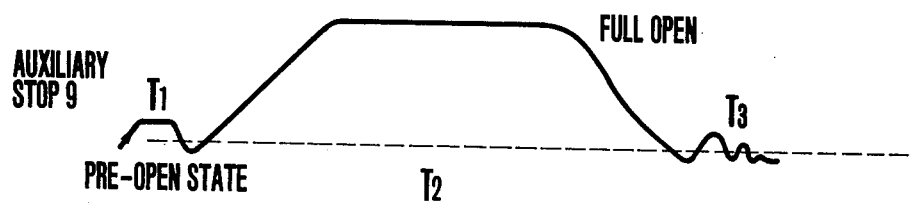

FIG.4
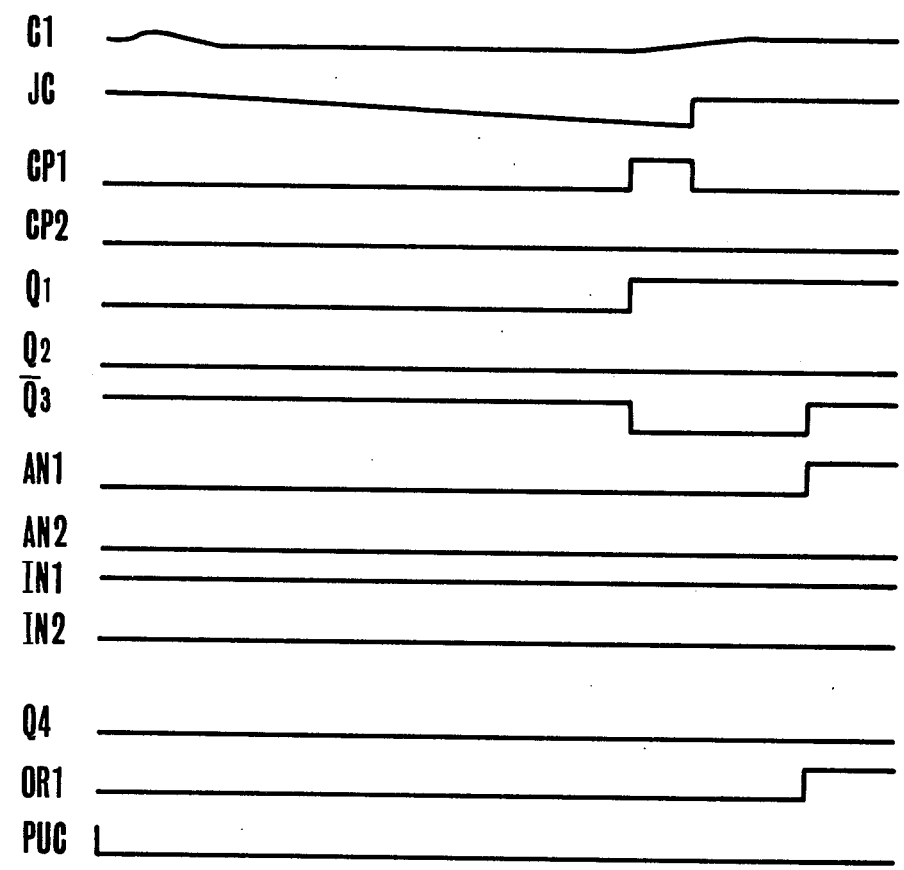
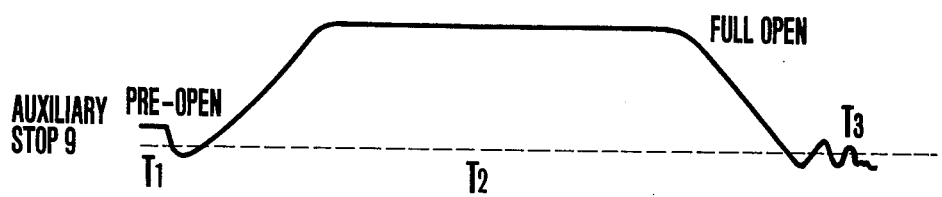

CAMERA PROVIDED WITH A DEVICE FOR GENERATING A SIGNAL REPRESENTATIVE OF THE FINISHED STATE OF THE EXPOSURE

BACKGROUND OF THE INVENTION

1. Field of the Invention

This invention relates to a shutter travel completion signal producing device for a photographic camera and more particularly to an improvement of a shutter travel completion signal producing device adapted for a camera of the type having a shutter operated by a reciprocating motion of shutter blades or a shutter blade driving member for which my copending U.S. patent application Ser. No. 279,222 was filed June 30, 1981 also relates.

2. Description of the Prior Art

Generally, a photographic camera is required to have some means for giving a signal representative of completion of the opening and closing operation of a shutter to an applicable part of the camera, because: After the shutter operation, a film winding action must be allowed to take place either by effecting power supply to a winding motor if the camera is of the type having an automatic winding function or by releasing a safety arrangement for winding if the camera is of the manual winding type. In addition to this purpose, the shutter travel completion signal, or a shutter closure signal, is also used for the purpose of releasing a release button depressing operation permitting mechanism to enable a release action again to take place.

In the case of a conventional shutter device of the type arranged to open and close the shutter by rotating a shutter driving member in one direction with a charged spring, the above-stated shutter closure signal is readily obtainable with a desired acting force through a sensing lever disposed in the rotation stopping position of the shutter driving member. However, in a shutter device of another type arranged to open and close the shutter by a reciprocating motion of the shutter blades or a shutter driving member, the shutter blade or the shutter driving member takes the same phase before opening of the shutter and after closing of the shutter. In other words, the position of the shutter blade before opening of the shutter is the same as the position thereof after closing thereof. Therefore, the arrangement of the sensing lever is not applicable to such a shutter device. Accordingly, the above-stated shutter closure signal has been not simply obtainable in the case of the shutter device of that type.

Particularly, in an electromagnetic shutter device which is arranged to cause a reciprocating motion of shutter blade by an electromagnetic force, the shutter blade driving electromagnetic force is hardly obtainable in sufficiently large magnitude for having a shutter closure signal produced by the shutter blade or a shutter driving member. This problem has been hindering cameras of the type having such a shutter device from being readily practicalized.

To solve this problem, the copending U.S. patent application Ser. No. 279,222 has previously proposed a device which is characterized in that: A light sensitive element is disposed in the rear of an auxiliary stop blade arrangement which is arranged to be movable together with shutter blades and to form an aperture corresponding to the aperture of the shutter blades. The output of the light sensitive element produced when a light flux from an object to be photographed is blocked by the auxiliary stop blade at the time of shifting of the shutter blades from an open state to a closed state is used for forming a shutter closure signal.

However, this arrangement of the prior art has presented a problem that the shutter blades often bounce at the time of shifting from the open state to the closed state. In other words, the shutter blades bounce somewhat backward from a closed state in the opening direction thereof, although the shutter at that time is kept closed by the overlapping arrangement of a plurality of shutter blades. In such a case, the auxiliary stop blade also bounces together with the shutter blades. The auxiliary stop blade takes an operative phase preceding the main aperture (shutter blade aperture) in order to compensate the exposure amount at a high brightness so that it is very likely that the auxiliary stop blade unduly opens if the shutter blade bounds for some reasons, although the main aperture does not open. In such a case, the shutter closure signal which has been obtained in the manner as described above would be nullified by the bounce of the shutter blades. Conversely, it is also possible that a bounce of the shutter blades might produce a false shutter closure signal. An ordinary electric shutter of the type having shutter blades opened and closed by an electromagnet is also not free from this problem.

SUMMARY OF THE INVENTION

It is, therefore, an object of the present invention to provide an improved camera which obviates the above stated disadvantages of the prior art by incorporating therein a device for generating a signal representative of completion of an exposure.

It is another object of the invention to provide a camera having a device for generating a signal representative of completion of an exposure, the camera comprising a light sensitive elements which detects the quantity of an incident light in association with an opening action of a shutter member disposed within a photo taking optical system; means for producing a shutter travel completion signal upon detection of a change that takes place in the quantity of the incident light (brightness) as a result of the closure of the shutter member; and means for holding the shutter travel completion signal.

These and further objects and features of the invention will become apparent from the following detailed description of embodiment thereof taken in conjunction with the accompanying drawings.

BRIEF DESCRIPTION OF THE DRAWINGS

FIG. 1 is a circuit diagram showing an embodiment of the invention.

FIG. 2 is a circuit diagram showing a clearing signal producing circuit used in combination with the circuit shown in FIG. 1.

FIG. 3 is a timing chart showing the operation of the embodiment when the brightness of an object to be photographed is high.

FIG. 4 is a timing chart showing the operation of the embodiment when the brightness of the object is low.

DESCRIPTION OF THE PREFERRED EMBODIMENT

Figure 5:
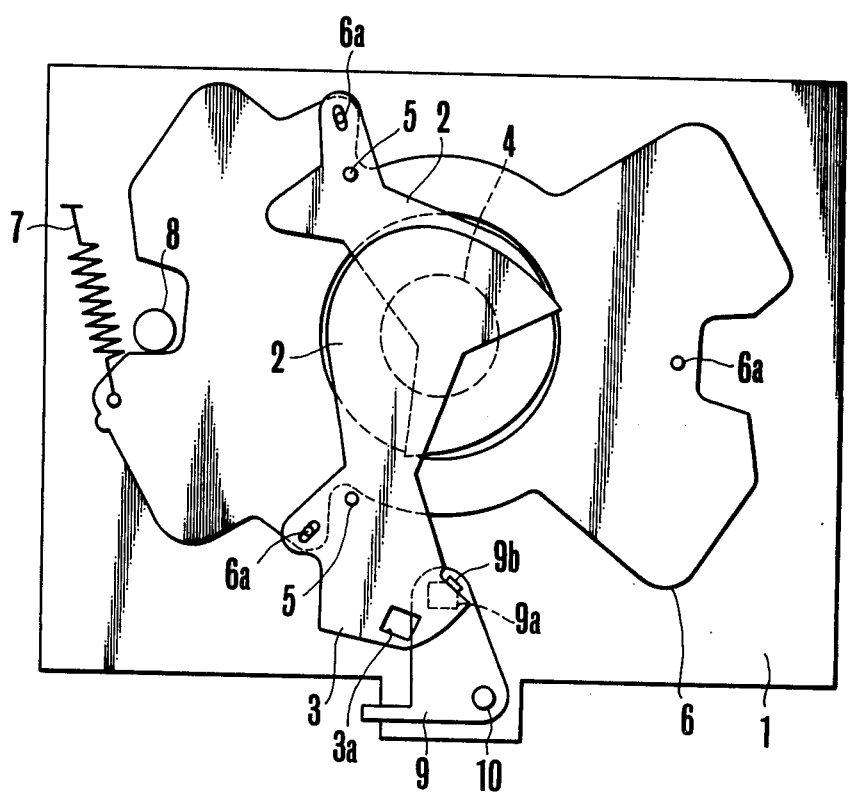
FIG. 5 is a front view showing by way of example an electromagnetically driven shutter usable for the camera according to the invention.

An example of the electromagnetically driven shutter according to the present invention is as shown in FIG. 5. Three shutter blades 2 which are arranged to serve also as stop blades or diaphragm blades are pivotally mounted by means of dowels 5 on a shutter base plate 1. A principal aperture 4 is arranged to be closed by these three shutter blades. A portion of the shutter blade group are serving as an auxiliary stop blade 3. A coil which is not shown is arranged on the surface of a sector ring 6. When this coil receives a power supply, the sector ring is caused to rotate counterclockwise by a driving force produced by the action of a magnetic field (Lorentz' force) in a manner as well known. A spring 7 is charged by the counterclockwise rotation of the sector ring 6. A stopper 8 is arranged to prevent the sector ring 6 from being caused by the spring 7 to rotate to an excessive extent. The same stopper 8 also serves to restrict the counter-clockwise rotation of the sector ring 6. The sector ring 6 is also caulked with three dowels 6a and is thus arranged to drive the shutter blades 2. An auxiliary stop 9 is connected by caulking to the shutter base plate 1 by means of a shaft 10 and is provided with an auxiliary stop aperture 9a. The illustration of FIG. 5 shows the shutter as in repose. The auxiliary stop is also provided with a window 9b (or preaperture) which is arranged to be defined between the edge of the auxiliary stop blade 3 and the auxiliary stop aperture 9a to detect the brightness of the object to be photographed for the purpose of giving a low brightness warning when the object's brightness is low. Meanwhile, the auxiliary stop blade 3 is also provided with an aperture window 3a. The area of the auxiliary aperture is arranged to be determined in association with the principal aperture 4. With the area of the auxiliary aperture determined, a light sensitive element which is provided behind the aperture 9a of the auxiliary stop 9 performs light measurement. The shutter arranged in this manner operates as described below:

When power supply is effected to the coil which is not shown but is provided on the sector ring 6, the sector ring 6 rotates counterclockwise. The shutter blades 2 also rotate counterclockwise. As a result of this, the windows or aperture 9a and 9b are closed by the auxiliary stop blade 3. When the sector ring 6 further rotates, an auxiliary aperture is formed between the auxiliary stop aperture 9a and the aperture window 3a of the auxiliary stop blade 3 and the light sensitive element begins to perform light measurement. Following this, the principal aperture 4 also comes to open to begin an exposure. A predetermined quantity of light then comes to the light sensitive element. Then, power supply to the coil is cut off through a process which will be described hereinafter with reference to FIG. 1. With the power supply cut off, the force of the spring 7 causes the sector ring 6 to rotate clockwise and the principal aperture 4 is closed thereby. Concurrently with that, the auxiliary aperture also closes to cause a change in the output of the light sensitive element. A shutter closure signal is obtained by detecting the change of the output of the light sensitive element.

In a shutter of the type having shutter blades opened directly by an electromagnetic force as described above, the shutter immediately shifts to a closing action when the shutter blade driving electromagnetic force is removed with the shutter fully opened. However, if the electromagnetic force is removed before full opening, i.e. while the shutter blades 2 is still in the process of their opening action, the force of inertia causes the shutter blades to continue their opening action for a while and the closing action by the urging force of the spring 7 does not begin before disappearance of the force of inertia. Hence, the timing for impressing the electromagnetic force must be determined with this force of inertia taken into account. Therefore, in some case where the brightness of the object to be photographed is high and the opening extent of the shutter blades 2 is short or in like cases, there is the possibility that the shutter blades 2 are opened solely by the force of inertia by removing the electromagnetic force before the shutter blades 2 come to open.

In view of this, the auxiliary aperture which is provided for light measurement is arranged to come into an open state before the principal aperture 4 which is provided for effecting exposure opens.

FIG. 1 is a circuit diagram showing an embodiment of the invention in which the invention is applied to the above stated electromagnetically driven shutter of the type serving also as a stop or diaphragm. In this embodiment, the quantity of transmission light coming from the auxiliary stop blade aperture which has a different optical axis from the principal aperture facing film and is arranged to be opened and closed in association with the shutter blades is measured. The timing for closing the shutter is controlled according to the result of light measurement. This shutter is of a semi-TTL (through the lens) light measuring system. Therefore, carry out exposure control without necessitating $\gamma$ conversion. Referring to FIG. 1, the embodiment includes an auxiliary stop 9; an ND filter 11 for obtaining information on the ASA sensitivity of film; a photo voltatic element (hereinafter will be called SPC) 12; and an operational amplifier 15 which uses a MOS type FET for the input thereto and forms an SPC head amplifier. The SPC 12 is connected to both input terminals of the operational amplifier 15. A diode 13 for logarithmic suppression is connected to the negative feedback route of the operational (hereinafter will be called OP for short) amplifier 15. A reference voltage source 14 is arranged to apply a bias voltage Vref1 to the input terminal on the positive side of the OP amplifier 15. The base of a transistor 16 for expanding is connected to the output terminal OP1 of the OP amplifier 15. Meanwhile, a capacitor 17 for a time constant is connected to the collector of the expanding transistor 16. A count start switch 18 is connected in parallel to the capacitor 17. The switch 18 is arranged to turn off in synchronism with the commencement of a shutter opening action. The input terminal of a comparator 19 on the negative side thereof is connected to the collector of the expanding transistor 16. To the other input terminal of the comparator 19 on the positive side thereof is connected to a reference voltage source 20 which is arranged to impress a reference voltage thereon for applying a bias voltage Vref2 thereto.

The output CP1 of the comparator 19 is arranged to be applied to the base of a PNP transistor 21 through a release switch SW2. The transistor 21 has a constant current circuit 22 connected to the collector thereof. The coil 23 of an electromagnetic driving device which is arranged to cause the shutter blades 2 of the shutter device as shown in FIG. 5 to make a reciprocating motion is connected to the output terminal of the constant current circuit. When power supply is effected to the coil 23, this electromagnetic driving device causes the shutter blades 2 to open against the force of the spring 7. When the power supply to the coil 23 is cut off, the electromagnetic driving device allows the spring 7 to close the shutter blades 2.

The output terminal of the above stated OP amplifier 15 has a transistor 30 for expansion connected thereto. A resistor 31 is connected to the collector of the transistor 30. A reference numeral 32 indicates a comparator. The input terminal on the negative side of the comparator 32 is connected to the collector of the transistor 30 to obtain the output C1 from the latter. A reference voltage source 33 which gives a bias voltage Vref3 is connected to the other input terminal on the positive side of the comparator 32. A numeral 34 indicates a D-flip-flop circuit (hereinafter will be called D-FF). The D input terminal of the D-FF 34 is connected to the output of the comparator 32 to obtain the output CP2 from the comparator 32. An inversion circuit 36 is also connected to the output terminal CP2 of the comparator 32. A numeral 35 indicates an RS-flip-flop circuit (hereinafter will be called RS-FF). The set input terminal S of the RS-FF 35 is connected to the output terminal CP1 of the comparator 19. A numeral 40 indicates an AND gate which is arranged to have three inputs. The three input terminals of the AND gate 40 are receiving the Q output Q1 of the RS-FF 35, the output IN2 of the inversion circuit 36 and the Q output of the D-FF 34. An inversion circuit 41 is connected to the Q output terminal Q2 of the D-FF 34.

A timer circuit 37 has a trigger input terminal $\overline{T}$ which is connected to the $\overline{Q}$ output terminal of the RS-FF 35. A trigger signal thus obtained is arranged to keep the $\overline{Q}$ output $\overline{Q}3$ at a low level (hereinafter will be called L level) for a period of a time constant determined by a resistor 38 and a capacitor 39. An AND gate 42 is arranged to have three inputs. The three input terminals of the AND gate 42 are respectively connected to the $\overline{Q}$ output terminal $\overline{Q}3$, the Q output terminal Q1 of the RS-FF and the output terminal IN1 of the inversion circuit 41 to obtain the outputs of them. Another RS-flip-flop circuit 43 (hereinafter will be called RS-FF 43) has a set input terminal connected to the output terminal AN2 of the AND gate 40. An OR gate 44 has two input terminals which are respectively connected to the output terminal AN1 of the AND gate 42 and the Q output terminal Q4 of the RS-FF 43. This OR gate is arranged to produce a shutter travel completion signal when the level of its output OR1 becomes high. An NPN switching transistor 45 has its base connected to be output terminal OR1 of the OR gate 44 through a resistor. Meanwhile, a motor 46 for winding is connected to the collector of the switching transistor 45. In another embodiment of the invention, an electromagnet 47 which is arranged to release a mechanism for allowing a release button to be depressed may be connected to the collector of the transistor 45. A winding completion switch 48 is connected in series to the motor 46 and is arranged to turn off when one frame of film is wound.

Referring now to FIG. 2, a numeral 50 indicates a power source battery; 51 indicates a main switch; and 52 indicates a circuit which produces a power up clear PUC signal when the main switch 51 is closed. The output of the circuit 52 is supplied to the reset terminals of the timer circuit 37, the RS-FF 35, the RS-FF 43 and the D-FF 34.

Next, the operation of the embodiment arranged as described above will be described below by dividing it into cases. In one case, the brightness of the object to be photographed is sufficiently high and the light measuring element 12 can detect the closing action of the auxiliary stop 9. In the other cases, the brightness of the object is low rendering the light measuring element 12 incapable of detecting the closing action of the auxiliary stop 9.

In the case where the brightness of the object is sufficiently high to give a sufficiently large brightness difference when the auxiliary stop is closed for detecting the closing action of the auxiliary stop, the operation of the embodiment is as shown in the timing chart of FIG. 3.

When the main switch 51 turns on, a one-pulse signal PUC is produced from the power up clear circuit 52. This signal resets the D-FF 34, RS-FF 35 and 43 and timer circuit 37. The levels of the outputs Q2, Q1 and Q4 respectively become low while the level of the output $\overline{Q}3$ becomes high.

The auxiliary stop 9 is in a pre-open state during a period T1 prior to a shutter release action as shown in FIG. 3 for low brightness warning light measurement. Therefore, the level of the output OP1 of the OP amplifier 15 increases as much as the logarithmically suppressed portion of the quantity of light incident upon the light measuring or sensitive element 12. The voltage C1 of the expanding transistor 30 is at an L level. Under this condition, when a shutter release action is performed to close the switch SW2, the PNP transistor 21 turns on. Accordingly, power is supplied to the coil 23 of the electromagnetic shutter. The shutter blades 2 as shown in FIG. 5 begin to be opened. During this opening action, the auxiliary stop 9 is closed for once. At this time, the collector voltage C1 of the expanding transistor 30 becomes a high level (hereinafter will be called H level). Accordingly, the output CP2 of the comparator 32 becomes an L level and the output IN2 of the inversion circuit 36 becomes an H level. However, at the time when the auxiliary stop 9 comes to close for once from its pre-open state, the RS-FF 35 is not set and the Q output Q1 thereof is at an L level. Therefore, the outputs AN1 and AN2 of the AND gates 40 and 42 are also at an L level. The output OR1 of the OR gate 43 is also at an L level. The shutter travel completion signal is therefore not produced.

When the opening action of the shutter blades 2 opens the principal aperture 4, the auxiliary stop 9 is again opened thereby (time T2) to again have a light incident on the light sensitive element 12.

Meanwhile, when a shutter release action causes the shutter blades 2 to begin an opening action, the count start switch 18 comes to open. At this time, the time constant capacitor 17 is charged with the expanding collector current of the expanding transistor 16. Then, as shown in FIG. 3, the collector voltage JC of the transistor 16 comes to drop. While the collector voltage JC is still higher than the input level Vref2 on the positive side of the comparator 19, the output CP1 of the comparator is at an L level. Therefore, the PNP transistor 21 is on. Since this causes a constant current (holding current) determined by the constant current circuit 22 to flow to the coil 23 of the electromagnetic shutter, the shutter blade opening action is continuously performed. During the process of the shutter blade opening action, when the collector voltage JC of the above stated expanding transistor 16 becomes lower than the input level Vref 2 of the comparator 19 on the positive side thereof to bring the exposure to an end, the output CP1 of the comparator 19 changes to an H level to become a shutter closing instruction signal. The PNP transistor 21 then turns off. As a result of that, power supply to the coil 22 of the electromagnetically driven shutter is cut off. The shutter blades begin to be moved in the shutter closing direction by a spring force. Further, the RS-FF 35 is set by the change of the output CP1 of the comparator 19 to the H level. The Q output Q1 of the RS-FF 35 then changes to an H level.

Further, as mentioned in the foregoing, when the auxiliary stop 9 is not closed by the shutter blades, the collector voltage C1 of the expanding transistor 30 becomes an L level. This changes the output CP2 of the comparator 32 to an H level. Therefore, when the Q output Q1 of the RS-FF 35 changes to an H level, the Q output Q2 of the D-FF 34 also changes to an H level and is kept at that H level. The output IN2 of the inversion circuit 36 changes to an L level. At this time, the $\overline{Q}$ output of the RS-FF 35 triggers the timer circuit 37. Then, the $\overline{Q}$ output $\overline{Q3}$ of the timer circuit 37 stays at an L level for a prescribed period of time determined by the resistor 38 and the capacitor 39.

When the shutter blades begin to close and when the principal aperture 4 and then the auxiliary stop 9 are completely closed (at time T3) as mentioned in the foregoing, the output of the OP amplifier 15 drops. With the output of the OP amplifier 15 becoming lower, the collector voltage C1 of the expanding transistor 30 becomes an H level. The output CP2 of the comparator 32 changes to an L level and the output IN2 of the inversion circuit 36 to an H level respectively. At this time, since other two inputs Q1 and Q2 of the AND gate 40 remain at an H level, the output AN2 of the AND gate 40 changes to an H level concurrently with the change of the output IN2 of the inversion circuit 36 to the H level. As a result of that, the RS-FF 43 is set and the Q output Q4 thereof changes to an H level. The output OR1 of the OR gate 43 then also changes to an H level to produce a shutter travel completion signal. In this instance, even if the auxiliary stop 9 is accidentally opened by a bounce of the shutter blades 2, the RS-FF 43 still persists in a set state thereof. As has been described above, in cases where the brightness of an object to be photographed is high, a shutter travel completion signal is produced when a change in brightness is detected by the light sensitive element of the auxiliary stop; and then the signal is latched by the RS-FF 43.

The following description of the operation of the embodiment applies to a case where a low degree of brightness of the object results in an excessively small brightness difference when the auxiliary stop 9 is closed and the closing action of the auxiliary stop 9 is not detectable. Under such a condition, the operation of the embodiment is as shown in the timing chart of FIG. 4.

In this case, the quantity of light incident upon the light sensitive element 12 of the auxiliary stop is insufficient even when the shutter comes to its full open state (time T2). Accordingly, the output voltage of the OP amplifier 15 little rises. Meanwhile, the collector voltage C1 of the expanding transistor 30 is in a state of somewhat below the level of the power source voltage Vcc. Therefore, the output CP2 of the comparator 32 remains at an L level. Therefore, after completion of a timing process of the time constant capacitor 17 for determining the shutter time (or exposure time), even when the output CP1 of the comparator 19 changes to an H level to set the RS-FF 35 of the next stage thereby causing the Q output Q1 to change to an H level, the output Q2 of the D-FF 34 is retained at an L level because of the L level of the D input thereto. Accordingly, the output of the AND gate 40 is kept at an L level even when the shutter is closed. Therefore, the RS-FF 43 remains unset. The Q output Q4 of the RS-FF 43 stays at an L level to produce no shutter travel completion signal from the RS-FF 43.

Since the timer circuit 37 is triggered by the $\overline{Q}$ output of the RS-FF 35 when the RS-FF 35 is set by the shutter closing instruction signal produced by the output CP1 of the comparator 19, however, the $\overline{Q}$ output $\overline{Q3}$ of the timer circuit changes to an H level a predetermined period of time after that.

Further, since at that time the Q output Q2 of the D-FF 34 is kept at an L level, the output IN1 of the inversion circuit 41 is at an H level. Meanwhile, since the output Q1 of the RS-FF 35 is also at an H level at that time, the output AN1 of the AND gate 42 changes to an H level. As a result of this, the output OR1 of the OR gate 44 also changes to an H level to produce a shutter travel completion signal.

In other words, when the brightness of the object is low, the shutter travel completion signal is produced after the lapse of a predetermined period of time after generation of the shutter closing instruction signal through the action of the timer circuit. This predetermined period of time is of course arranged to be somewhat longer than the period from the commencement of the closing action of the shutter till the end of the bouncing motion of the auxiliary stop blade 3, etc. after completion of the closing action of the shutter.

As described in the foregoing, in the embodiment, a shutter travel completion signal is arranged to be produced by detecting the closure of the auxiliary stop 9 through a change in the brightness. This arrangement gives a reliable, highly precise shutter travel completion signal without requiring any excessive force exerted for the reciprocating motion of the shutter blades 2. Besides, the arrangement to produce the shutter travel completion signal through the timer circuit 37 in an anticipatory manner always a predetermined period of time after the generation of the shutter closing instruction signal ensures an increased reliability of the shutter travel completion signal.

Since the shutter travel completion signal is latched as mentioned in the foregoing, the invention obviates the fear that the signal might be nullified by an accidentally opened state of the auxiliary stop aperture resulting from a bounce of the auxiliary blade 3 or the like.

Further, the arrangement to produce the shutter travel completion signal on the basis of an AND signal obtained from a latch signal of the shutter closing instruction signal and the shutter closure signal produced by the light measuring element of the auxiliary stop as described in the foregoing effectively prevents a false shutter travel completion signal from being produced when the auxiliary stop 3 is temporarily closed from the pre-open state before an actual opening action of the shutter takes place.

In accordance with the invention, the signal from the auxiliary stop 3 is temporarily kept in a latched state in closing the shutter. This arrangement completely eliminates all possibilities of erroneous action signals that otherwise might be caused by bouncing of the shutter blades 2. Besides, the provision of an additional holding circuit for such latching ensures formation of reliable closing signals. These are great advantages for an electric shutter.

Further, it will be apparent from the foregoing description that the invention is also advantageously applicable to a camera of the conventional type arranged to open and close a shutter by turning a shutter driving member in one direction by means of a charged spring.

In this particular embodiment, the same light sensitive element is arranged to be used for combined purposes of detecting the shutter travel completion and detecting an exposure. However, the invention is not limited to such arrangement and it is of course possible to provide a discrete light sensitive element solely for exposure detection.

What I claim:

1. A camera provided with a device for generating a signal representative of a finished state of exposure, said signal generating device comprising:
   means for generating a signal for closing a shutter;
   a light measuring means for detecting the variation of the incident light amount in relation to the finish of shutter action to generate a detection signal; and
   circuit means connected to said light measuring means and to said means for generating the shutter closing signal, wherein said circuit means are operated to generate a signal representative of the finished state of an exposure only when both said detection signal and said shutter closing signal were generated, and wherein said circuit means include signal holding means for holding said representative signal.

2. A camera with a device for generating a signal representative of the finished state of an exposure comprising:
   shutter having blades functioning as aperture setting members, and disposed in the optical path of photographic light;
   means for generating a signal for closing said shutter;
   an auxiliary diaphragm adapted to move in relation to the movement of said shutter;
   light measuring means having a light measuring element disposed at said auxiliary diaphragm;
   said light measuring means detecting the variation of the brightness of the incident light through said auxiliary diaphragm in relation to the finish of shutter action to generate a detection signal; and
   circuit means connected to said light measuring means and to said means for generating the shutter closing signal, wherein said circuit means are operated to generate a signal representative of the finished state of an exposure only when both said detection signal and said shutter closing signal were generated, and wherein said circuit means include signal holding means for holding said representative signal.

3. A camera provided with a device for generating a signal representative of the finished state of an exposure, said camera including a light sensing element, a shutter, a diaphragm arranged in the photographing optics and acting at the same time as said shutter, and an auxiliary diaphragm; said light sensing element arranged at said auxiliary diaphragm and arranged so as to receive the light through said auxiliary diaphragm, said auxiliary diaphragm being operatively engaged with said shutter, the representative signal being obtained from a detection signal corresponding to the brightness variation in relation to the finish of shutter action obtained by said light sensing element, said representative signal being held irrespective of bound action of the shutter when the shutter is closed.

4. A camera according to claim 3, wherein said auxiliary diaphragm has a portion in a pre-opened state for measuring a light to alarm a low brightness before a shutter release, said pre-opened portion being closed immediately after the start of shutter action, said auxiliary diaphragm being opened in accordance with a shutter opening and being closed in accordance with a shutter closing, and wherein said light sensing element measures a light from an object to be photographed when the shutter is opened; and wherein said camera further includes means for generating a signal for closing said shutter in response to the light measuring results of said light sensing element.

5. A camera according to claim 4, wherein the such representative signal is produced with a logic product signal of a brightness variation detection signal from said light sensing element in relation to the finish of shutter action and a shutter close order signal from said generating means.

6. A camera according to claim 5, wherein the such representative signal is produced after the lapse of a certain predetermined time after the shutter close order signal is produced in case the object brightness is so low that the light sensing element cannot detect the brightness variation in relation to the finish of shutter action.

7. A device for generating a signal representative of exposure completion comprising a light measuring element for detecting the amount of an incident light in relation to an opening operation of a shutter member arranged in a photographic optical system, means for producing and holding the exposure completion signal by detecting variation in brightness of the light measuring element corresponding to the closing of the shutter member.

8. A device according to claim 7, in which the exposure completion signal is generated with a holding signal of a logic product signal of a detection signal generated by the detection of the brightness variation of the light measuring element and a holding signal of a shutter closing order signal output depending on the amount of incident light to the light measuring element.

* * * * *